Patented Aug. 7, 1934

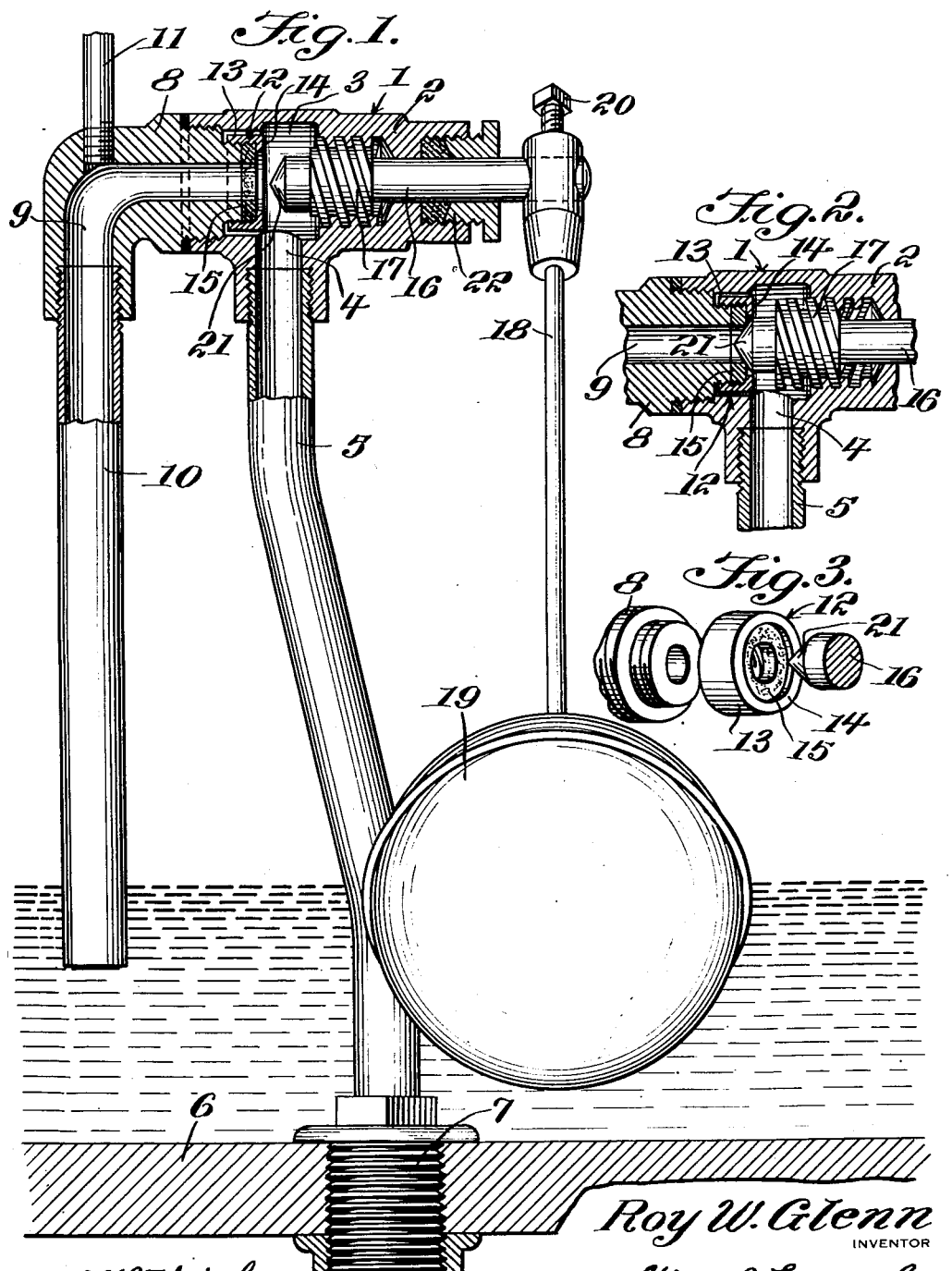

1,969,645

UNITED STATES PATENT OFFICE 1,969,645

BALL COCK OR VALVE

Roy W. Glenn, Linton, Ind.

Application May 9, 1932, Serial No. 610,258

1 Claim. (Cl. 251—43)

This invention relates to float actuated valves for flush tanks and similar devices and has for the primary object, the provision of a valve element rotatable in opposite directions and equipped with feed threads for moving the valve element into and out of seated position when rotated by the rise and fall of the float.

Another object of this invention is the provision of a novel removable seat for the valve element and through which the fluid is adapted to pass while the valve element is in an unseated position and which is capable of easy repair or renewal.

A further object of this invention is the provision of means whereby the valve element may be easily and quickly removed from the valve housing after the removal of the valve seat and without disturbing the mounting of the valve housing or its connection to the fluid supply.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a valve constructed in accordance with my invention and showing the same applied to a fragmentary portion of a flush tank.

Figure 2 is a fragmentary sectional view showing a valve element associated with a seat.

Figure 3 is a diagrammatical view showing the valve seat disassembled and a portion of the valve element.

Referring in detail to the drawing, the numeral 1 indicates a valve housing consisting of a body 2 having a chamber 3 therein and opening outwardly through each end of said body and also through one side thereof as shown at 4 for the purpose of forming an inlet to which a supply pipe 5 is detachably secured. The supply pipe 5 is mounted in a flush tank 6 in the usual manner as shown at 7 and by referring to Figure 1 it will be noted that the pipe 5 is curved or offset so that the position of the valve 1 within the tank may be varied. An L-shaped coupling 8 is threaded into one end of the body 2 and forms an outlet for the chamber 3 by having a passage 9 formed therein. An outlet pipe 10 is detachably secured to the coupling 8 for communication with the passage 9 for the purpose of delivering fluid to the lower portion of the tank. A refill tube 11 is in communication with the passage 9 and is detachably secured to the coupling in any suitable manner. The end of the coupling 8 located within the chamber 3 is reduced and screw-threaded to be engaged by a valve seat 12. The valve seat 12 consists of an internally threaded cage 13 threaded to the reduced end of the coupling and is provided with an annular flange 14 between which and the end of the reduced end of the coupling is positioned an apertured washer 15 forming a yieldable portion for a valve element 16 to engage for the purpose of closing the chamber 3 to its outlet or passage 9 of the coupling. The valve element 16 has formed thereon feed threads 17 meshing with feed threads formed in the walls of the body 2 and the valve element extends outwardly of the body at one end thereof to which is adjustably secured a float rod 18 carrying a float 19. A set screw 20 is employed for adjustably securing the float rod 18 to the valve element. The inner end of the valve element is of conical shape as shown at 21 to engage in the opening of the washer and thereby providing a leak-proof connection for the purpose of preventing escape of fluid through the valve when the valve element is in a seated position. A stuffing gland 22 is provided between the valve element and the body 2 of the valve housing.

The descending of the float causes a rotation of the valve element in one direction and due to the feed threads, said valve element is imparted an endwise movement away from the seat allowing a free flow of fluid through the valve housing. The raising of the float 19 imparts rotation to the valve element in a reverse direction and the feed threads cause an endwise movement of the valve element in an opposite direction, bringing the conical shaped end 21 into tight engagement with the washer closing the valve or preventing fluid from the supply pipe 5 from passing on into the passage 9 of the coupling 8.

To replace the valve seat it is only necessary to detach the tube 11 from the coupling and unthread the latter from the valve housing exposing the valve seat whereby the cage may be conveniently removed from the coupling and the washer repaired or replaced. Should for some reason it be desired to remove the valve element from the valve housing, the same can be easily accomplished by detaching the float rod therefrom and threading the valve element outwardly of the valve housing after the detachment of the coupling 8 therefrom.

While I have shown and described the preferred embodiment of my invention, it will be understood that minor changes in construction, combination and arrangement of parts may be made without departing from the spirit and scope of my invention, as claimed.

Having thus described my invention, what I claim is:—

A valve comprising a horizontally arranged body having a chamber opening outwardly through one end thereof and provided with an inlet port intermediate its ends and on the lower side thereof for connection to the upper end of a vertically arranged supply pipe, an L-shaped outlet coupling threaded in the open end of the chamber for closing the body and having a reduced screw threaded portion terminating adjacent the inlet port to form a rest, a valve seat engaging the rest, a flanged cage receiving the seat and threaded to the reduced portion to force the seat against the rest and adapted to permit the removal of the seat with the coupling from the body by way of the open end of the chamber, a valve element threaded in the body for rotation in opposite directions, and an operating means removably secured to the valve element for imparting a rotation to said valve element in either direction to engage and disengage the latter with the seat and detachable from the valve element to permit removal of said valve element from the body by way of the open end of the chamber after the removal of the coupling.

ROY W. GLENN.